United States Patent [19]

Busboom et al.

[11] Patent Number: 5,247,663

[45] Date of Patent: Sep. 21, 1993

[54] METHOD AND APPARATUS FOR CONSTRUCTING CONTINUED ENTRY FIELDS WITH MULTIPLE TERMINALS

[75] Inventors: Leah J. H. Busboom, Oronoco; Stephen T. Eagen; Harvey G. Kiel, both of Rochester; Raymond F. Romon, Oronoco; David G. Wenz, Rochester, all of Minn.

[73] Assignee: International Business Machines Corporation, Armonk, N.Y.

[21] Appl. No.: 639,505

[22] Filed: Jan. 9, 1991

[51] Int. Cl.⁵ .............................................. G06F 7/00
[52] U.S. Cl. .................................. 395/600; 395/155; 395/700; 364/DIG. 1; 364/286; 364/237.3
[58] Field of Search ................. 364/DIG. 1 MS File, 364/DIG. 2 MS File; 395/144, 155, 600, 700

[56] References Cited

U.S. PATENT DOCUMENTS

| 3,905,022 | 9/1975 | Klosky et al. | 364/DIG. 2 |
| 4,458,311 | 7/1984 | Clements et al. | 364/DIG. 1 |
| 4,704,703 | 11/1987 | Fenwick | 364/DIG. 2 |

Primary Examiner—Thomas M. Heckler
Attorney, Agent, or Firm—Palmatier, Sjoquist & Helget

[57] ABSTRACT

A method and apparatus for displaying entry fields on a workstation display screen, wherein a single entry field may be constructed having selectively positionable segments, and wherein each of the segments are linked together for processing, so that an entry field modification made in any of the segments will result in processing all of the segments for accommodating the modification; the method and apparatus are practiced in a system having a host processor, at least one workstation control interface, and a plurality of workstations.

6 Claims, 16 Drawing Sheets

Send a Message

Send Message To... _____

.Message Sent From.. . _____

Copy List. . . . . . . _____
_____

Message Text. . . . . _____
_____
_____

Alternate Command. _____
_____

PRIOR ART ENTRY FIELDS

FIG. 6

Send a Message

Send Message To. . . . ._____

Message Sent From. . . ._____

Copy List. . . . . . . . _____
_____

Message Text. . . . . . ._____
_____
_____

Alternate Command. . _____
_____

FIG. 7

METHOD AND APPARATUS FOR CONSTRUCTING CONTINUED ENTRY FIELDS WITH MULTIPLE TERMINALS

BACKGROUND OF THE INVENTION

The present invention relates generally to computer workstations which are connected for information interchange with host or mainframe computer systems; more particularly, the invention relates to a method and apparatus for controlling the displayed position of entry field data on certain computer workstations by processing keystroke operations at a workstation control interface without participation of the host processor to which the workstation is connected. Further, the invention enhances the user interface associated with certain types of entry fields displayed on workstations.

In any typical prior art system utilizing a host processor, workstation control interface, and workstations, wherein the workstations are utilized for user interaction and access and the host processor is utilized for running application programs, the host processor provides certain fundamental information. For example, the host processor may generate a data stream containing information to be displayed on a workstation screen, and information for controlling the presentation and position of the data on the screen. In the case of a programmable workstation (PWS), the host processor data stream is sent directly to the workstation and is processed internally in the workstation, which itself contains sufficient internal memory and program data to directly control the interaction with the display screen and keyboard. In the case of a dependent workstation (DWS), the host processor data stream is sent to a workstation controller (WSC), and the WSC provides the internal memory and control for directly controlling the display screen of the DWS. In either case, the host processor-constructed data stream is received by a workstation control interface (hardware and/or software), and the workstation control interface processes the data stream. The workstation controller may poll attached DWS workstations to determine whether a keystroke should be recognized or whether any of a predetermined number of commands from the workstation controller have been processed.

Although a PWS terminal is of considerably more sophisticated design than a DWS terminal, when it is used in an environment where a host processor executes applications programs and merely utilizes the PWS terminal for DWS-like operator/user interface, the PWS terminal suffers from most of the same limitations as a DWS terminal. For example, each time a display panel is to be changed on the screen of either type of terminal as a result of user interaction, the host processor creates the panel description, and presentation, and constructs a data stream for transmission to the terminal. For convenience herein, reference will be made primarily to DWS terminals throughout, it being understood that the uses and advantages of the invention are equally applicable to both types of terminals. Where reference is made herein to workstation controllers (WSC), it should be understood that such controllers are associated with DWS terminals, and PWS terminals do not utilize workstation controllers except for basic connectivity. PWS terminals communicate directly with the host processor through suitable I/0 communications controls, but PWS devices have internal logic which effectively performs the same workstation control interface functions as are performed by workstation controllers.

In the course of communicating with remote terminals via a workstation control interface, the host processor application program and/or display data manager program assembles data for transmission to the remote terminal for constructing display panel images. Among the display panel constructs which have been uniformly adopted is the entry field, which is understood to be a continuous field reserved for entry of information by the operator through the operator keyboard. The size and position of entry fields are defined by the host applications program and/or display data manager program, and entry fields are usually highlighted on the display screen by regions of underlining, to provide an indication to the operator concerning the position and width of an entry field. If an entry field is longer than the space available on a single line of panel display, the entry field will wrap to the next line of panel display to provide the necessary character columns deemed to be relevant to the particular entry field input information. A single panel display may have more than one or two entry fields, and each entry field may be accessed by cursor positioning to the initial character position of the entry field. For purposes of the present invention, it is convenient to define a variant form of entry field; namely, the "continued entry field." A continued entry field may occupy any position on a display panel, but when a continued entry field extends from one display line to the next display line it does not necessarily wrap to the leftmost position of the second display line. A continued entry field may contain a plurality of individual segments, wherein each segment may be uniquely positioned on the display panel, not necessarily in the form of a continuous line extending from the last column of one line and wrapping to the first column of the next subsequent line. The segments of a continued entry field are linked together according to the teachings of the present invention, and multiple continued entry field segments are processed as a single entry field rather than as a plurality of discontinuous entry fields.

SUMMARY OF THE INVENTION

The present invention provides a method and apparatus for constructing continued entry fields for displaying panel data within specified screen areas at a workstation, to better control the presentation of such entry fields, particularly in restricted display environments such as those created by windows. This is enabled by an extended data stream interface between the host processor and the workstation control interface, including data which defines each segment of a set of continued fields. The host application software uses data stream conventions to position and define each segment in the set of continued fields, and each continued entry field segment definition includes a new type of "field control word" that identifies it as a segment in a set of continued fields. The field segments can be arranged within a display panel as desired by the application software. The workstation control interface presents a display panel containing continued field segments in the same manner as it presents separate entry fields; however, the workstation control interface retains information about the location and length of the continued field segments in order to process editing of data within the fields, and processing associated with returning entry field data to the host.

The set of continued field segments are treated by the workstation control interface as a singular field when edit keys are actuated and the cursor is within the field. When any segment of a continued field is modified, the field data for the entire set of continued field segments is returned to the host processor for further action, even though only a single field segment may actually have been modified.

It is a feature of the present invention to enable the display data manager software within a host processor to be written so as to provide a consistent mechanism within the applications program interface for the definition of continued fields in all workstation environments.

It is another feature of the present invention to provide a storage area within the workstation control interface so as to enable the transmission of continued field segments in a conventional manner between the workstation control interface and host processor, and to include transmission of all continued field segments whenever any segment is modified by the user.

It is the principal object of the present invention to provide continued entry fields in systems including a host processor and a plurality of workstations, including a plurality of dependent workstations which are connected into a host processor via a workstation controller.

It is a further object of the present invention to enable a workstation controller to accept a data stream from a host processor which defines segments of continued fields, to enable the workstation controller to control the presentation of and editing within the field segments and to return the entire continued entry field to the host processor when any segment of the field is modified.

BRIEF DESCRIPTION OF THE DRAWINGS

The foregoing and other objects and advantages of the invention will become apparent from the following specification, and with reference to the claims and the appended drawings, in which:

FIG. 6 shows an example panel with an entry field presentation according to the prior art;

FIG. 7 shows an example panel with continued field presentation according to the invention;

DESCRIPTION OF THE PREFERRED EMBODIMENT

Programmable Workstation

Figure 1:
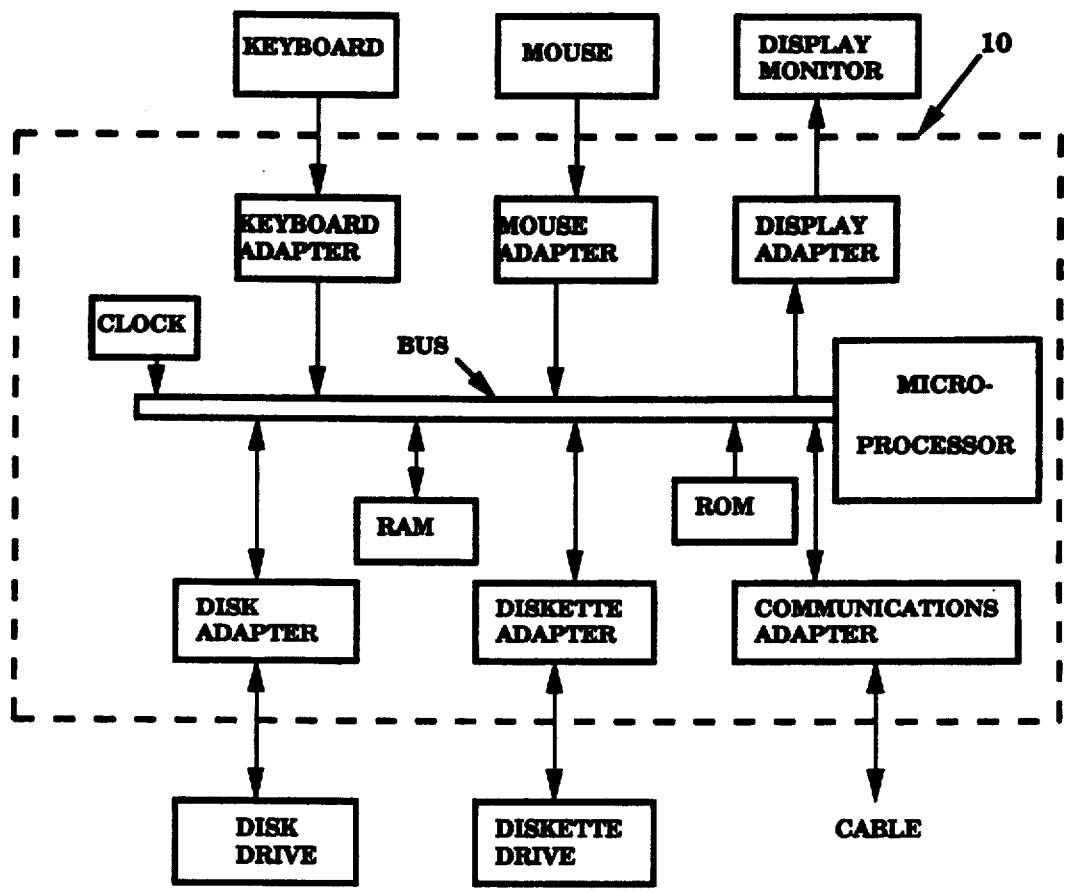
FIG. 1 shows a typical block diagram of a PWS.

Referring first to FIG. 1, there is shown a typical block diagram of a programmable workstation (PWS); the circuits within the dotted outline 10 are generally found on one or more circuit boards within the PWS framework. The microprocessor is typically an Intel type 80286 or 80386, or equivalent microprocessors by other manufacturers. The microprocessor has an external bus which may communicate with a number of adapters which themselves are connectable to various internal and external devices.

The host processor communicates with the PWS via a communications line, identified as a "cable" in FIG. 1. A plurality of PWS devices may be connected to a host processor via such communications lines, wherein each PWS has an internal application program known as "Workstation Function," which enables the PWS to perform the same tasks as the combination of a DWS and workstation controller as hereinafter described. The host processor is not concerned with, nor does it require specific knowledge of, which of the several types of remote workstations it is communicating with. When the host processor determines that a display screen representation is to be transmitted to a remote workstation, it constructs a data stream having the content described above, which is known in the prior art as a "5250 data stream." The format of this data stream is identical for communications with a PWS and a WSC, for the Workstation Function software operating within the PWS enables the PWS to process the data stream in the same manner as a WSC would process the data stream. While the processing actions within a PWS differ from the processing actions within a WSC, the external interaction with a host processor is identical in both cases. Likewise, when the operator at a remote workstation makes a keystroke, the processing actions which pass to the host processor are identical in either case, although the internal processing within a PWS is different from the internal processing within a workstation controller.

The typical PWS will have a keyboard, and optionally a mouse, connected through adapters to the internal bus, a display monitor connected through an adapter to the internal bus, one or more disk or diskette adapters coupled to one or more disk or diskette drives and connected to the internal bus, and a communications adapter which is connectable to other systems via external cables. The RAM is typically a random access memory having 1-16 megabyte capacity, which is sufficiently large to store a complete operating system, an extensive work area for programmable calculations, a monitor screen buffer area and an area for executing application programs. The ROM is a read only memory which typically contains coding for initializing the machine, for performing diagnostic operations, and for controlling the basic I/O system; the ROM is typically 64-128 kilobytes in capacity. The PWS is therefore operable as a stand-alone computer system, or as an independent workstation which may be connected to a host computer via external cables. The capabilities of the PWS enable it to provide a wide variety of user enhancements, including a full range of cursor controls, instantaneous scrolling, and display screen modification. All of these enhancements are contained and controlled within the PWS itself, although when a PWS is connected to a host computer processor and is operated as a workstation, it receives its overall command and control from the applications software in the host processor. In the preferred embodiment, the PWS shown in FIG. 1 is an IBM Personal System/2 or equivalent, although another IBM personal computer, or equivalent design, could be used.

Dependent Workstation

Figure 2:
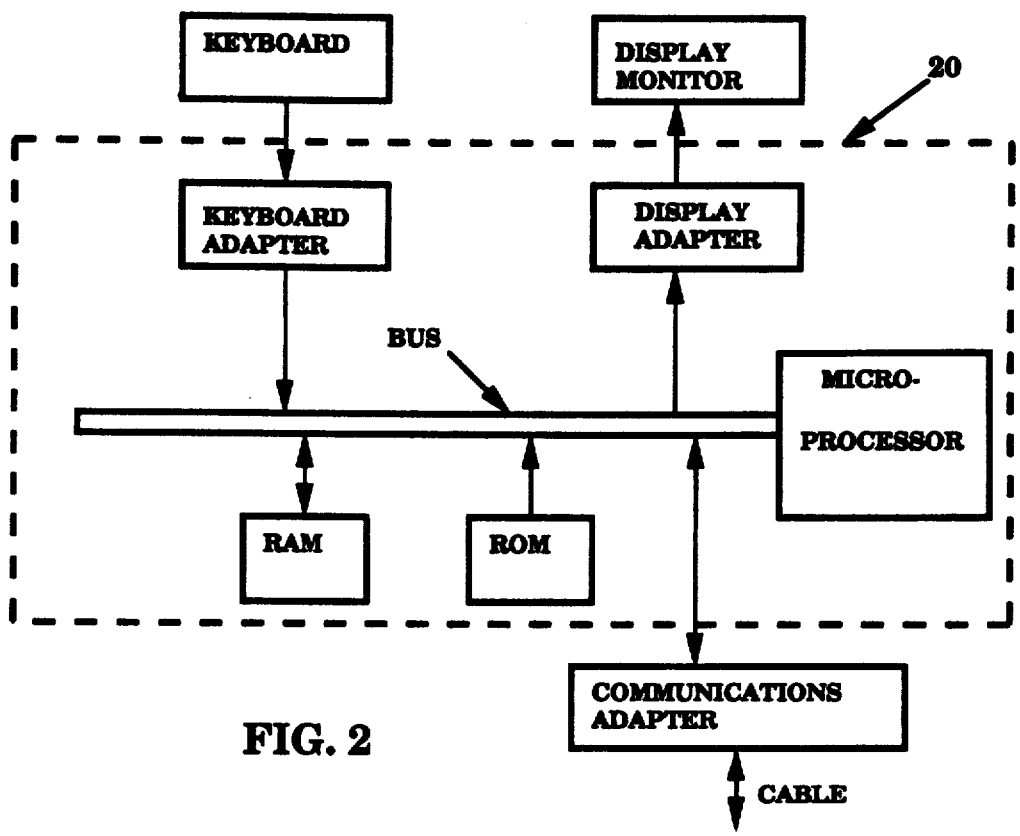
FIG. 2 shows a typical block diagram of a DWS.

FIG. 2 shows a typical block diagram of a DWS, wherein the circuits typically found within the framework are designated within dotted outline 20. The microprocessor is typically an Intel type 8088 or 8086 circuit device, or equivalent, and the microprocessor has an external bus which is connectable to several adapters for enabling communications with a limited number of external devices. For example, a keyboard adapter enables communications between the microprocessor and a keyboard, a display adapter enables information to be transferred to a display monitor, and a "communications" adapter enables communications to be made between the DWS and a workstation controller. The RAM is typically capable of 3-5 kilobytes of storage, for storing a screen buffer, and for providing a limited amount of memory work area for internal processing. The ROM is typically about 8 kilobytes in capacity, for storing coding relating to power-on processing, diagnostics, and character generation patterns and process communication protocols for communicating with a workstation controller. The DWS is incapable of any significant internal processing beyond that which is required to interface with the keyboard and display monitor, and to communicate via the communications adapter. Therefore, all of the information (except for diagnostics and set-up information from ROM) displayed on the display monitor must be provided via the communications adapter to the RAM, and the microprocessor will generate sufficient internal control to display the information on the display monitor. Similarly, all keystrokes from the keyboard are temporarily received in the RAM, subject to activation of the communications adapter for transmission of the keystroke information over the cable to the WSC. In the preferred embodiment, the DWS shown in FIG. 2 is an IBM 5250 family display, although other equivalent types of DWS could be used.

Workstation Controller

In typical systems, the function of a "workstation controller" is to provide information transfer and control to a plurality of remote DWS devices from a single host processor. This workstation controller function is usually performed by a hardware and software package which is uniquely identified and separate from the host processor hardware and software packages. The hardware for a workstation controller is typically contained on a circuit board package which is pluggable into a host processor card slot, and the software for a workstation controller is typically executed by the hardware independently of software which is executed by the host processor. However, in certain systems, the workstation control interface function of a "workstation controller" is entirely a software package function, the software being executed within the host processor hardware. Although the preferred embodiment of the present invention is disclosed with respect to the workstation controller concept which is physically separate from the host processor in both hardware and software details, the invention is applicable to the second type of workstation controller, wherein the functions are performed entirely by a software package residing in a host processor.

If a workstation controller is physically remotely positioned from the host processor, its communications with the host processor are made via communication lines, connected in a manner similar to the connection of various other remotely located devices. If the workstation controller is physically incorporated into the host processor mainframe as a pluggable card, the workstation controller may communicate with the host processor utilizing the normal channel connections associated with the host processor.

Figure 3:
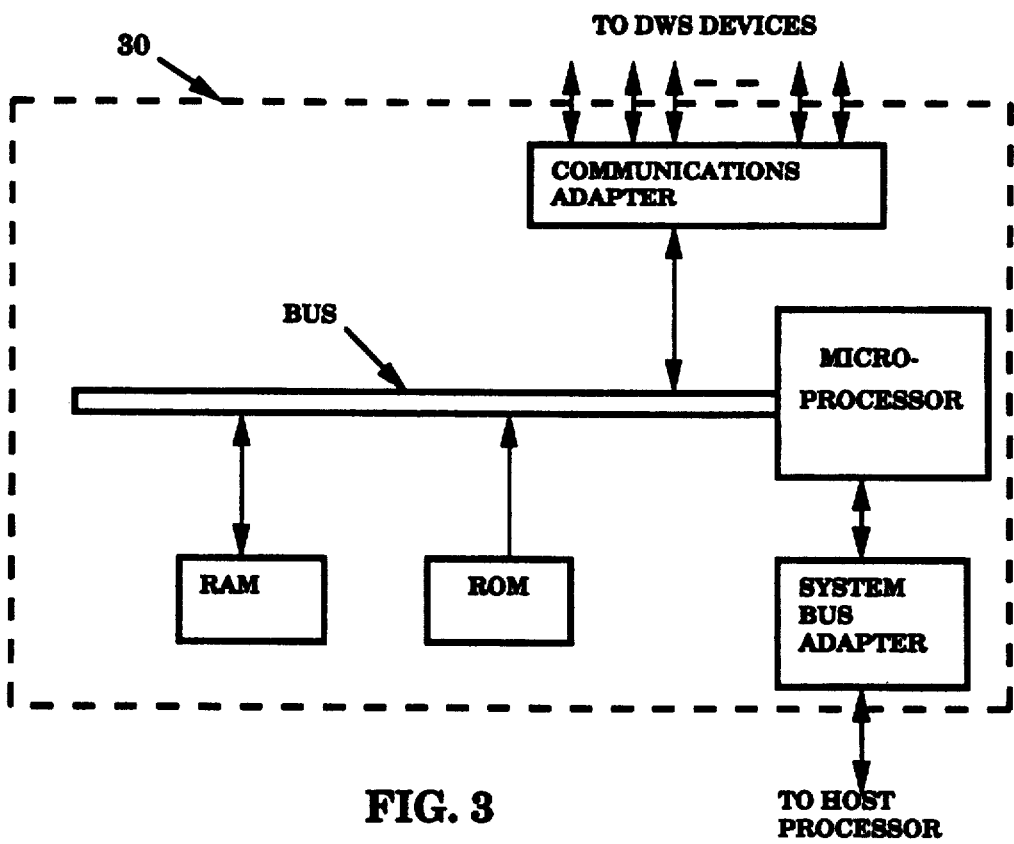
FIG. 3 shows a typical block diagram of a workstation controller.

FIG. 3 shows a typical block diagram of a workstation controller, of the type which typically communicates with a plurality of DWS devices. The workstation controller has a number of circuits contained within a package designated by dotted outline 30, and a microprocessor which is typically an Intel type 80826 circuit chip, or equivalent. The WSC microprocessor is typically connected to a system bus adapter which itself may communicate with a host computer processor. The WSC also has an internal data bus and a RAM having a capacity of 0.5-2.0 megabytes, and a ROM having a capacity of about 16 kilobytes, containing coding for initializing the WSC and for diagnostics relating to the WSC. The internal data bus of the WSC is connected to a communications adapter, which is externally connected to a "fan-out" multiplexer for enabling a plurality of DWS devices to communicate with a single WSC. In a typical application, the fan-out circuits are connectable to up to 40 DWS devices. Keystroke signals from all of the DWS devices are received by the WSC and stored within the RAM, for subsequent communication to the host processor or for internal processing by the WSC. In the preferred embodiment the WSC of FIG. 3 is a "feature card" for an AS/400 computer system, wherein the microprocessor is suitably programmed.

Figure 4:
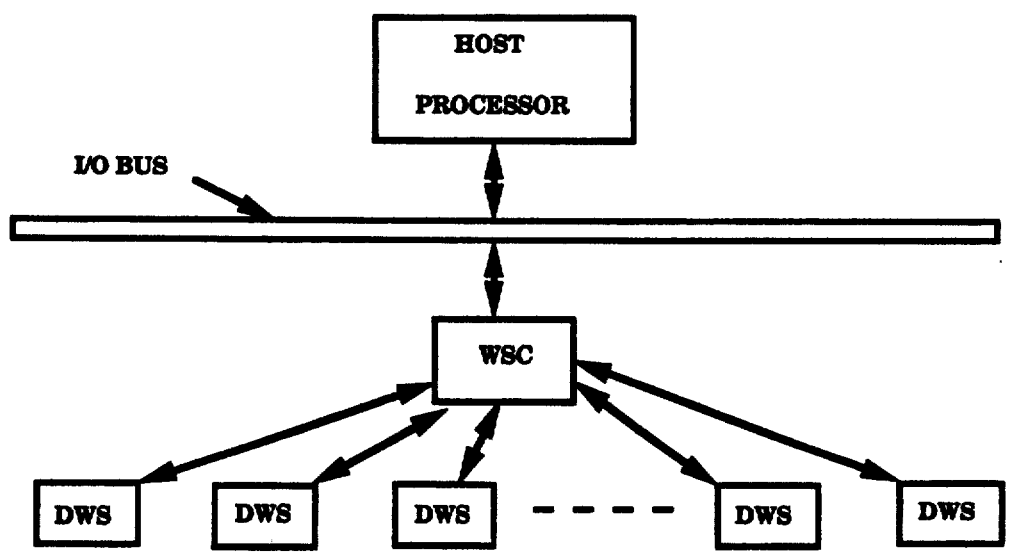
FIG. 4 shows a typical block diagram of a plurality of DWS devices connected to a host computer via a WSC.

FIG. 4 shows a typical block diagram of the system interconnections, wherein the host processor communicates with a WSC via an I/O bus, and a WSC communicates with up to 40 DWS devices via communications cables. Other devices and controllers may be connected to the I/O bus for communication with the host processor. In the preferred embodiment, the host processor is part of an AS/400 computer system.

Under typical operating conditions in the prior art, the host processor will construct a data stream for each of the terminals to which it is connected, the host processor will then transfer a data stream representative of each screen display and entry field definitions to the WSC, where entry field definitions are retained and the display screen data is temporarily retained within a section of RAM identifiable with each particular DWS. The WSC then transfers the screen display data to a specific DWS device. Each DWS device contains sufficient internal storage to retain the screen display data for purposes of presenting the display image to the user. If a DWS user makes a keystroke, the DWS signals the WSC that the DWS has keystroke data available. The WSC makes the transfer of this keystroke data when polling the DWS.

Figure 5:
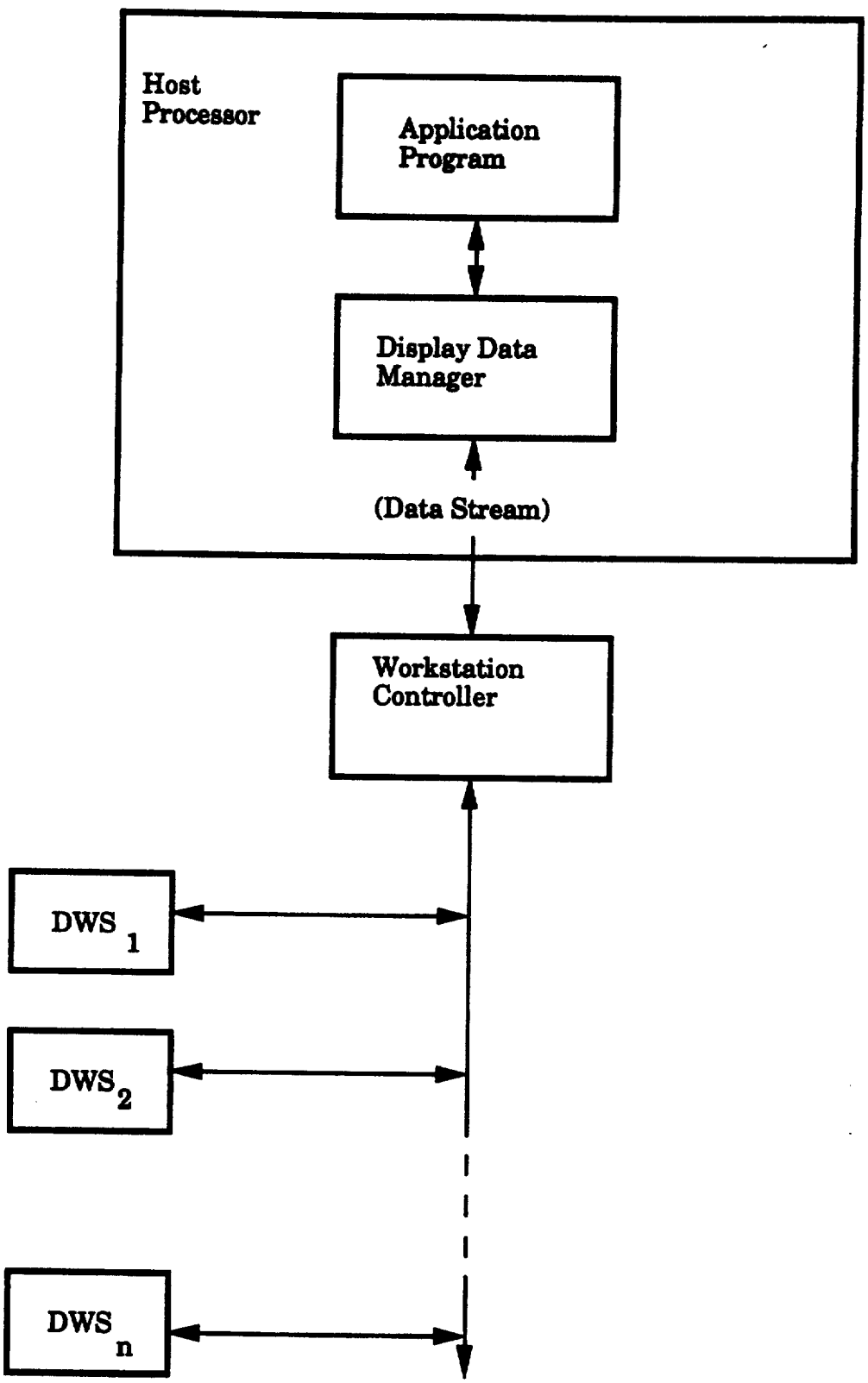
FIG. 5 shows a simplified diagram illustrating display data flow in a system having DWS terminals.

FIG. 5 shows a simplified diagram to illustrate the display data flow in a system having DWS terminals. The host processor executes application programs as a part of its normal operating function. These application programs communicate, from time to time, with the remote terminals connected in the system, either by processing keyboard data sent from the terminals or by generating display information to be transmitted to the terminals for display. When an applications program needs to communicate with a remote terminal it calls up an applications program interface routine, one form of which is identified as a "display data manager." When information is to be displayed at a remote terminal, the display data manager constructs a data stream according to a particular format, and transmits this data stream to a workstation controller. The workstation controller selectively interacts with all of the DWS devices, selectively activating the appropriate device and then passing the information to be displayed onto the selected DWS device.

An enhancement to predefined panel areas is the concept of "windows" which permits an application to present an overlay panel area which may include entry fields. Since the "windows" are typically relatively small areas of display, they present further and unique problems concerning the display and positioning of entry fields, and one of these problems is the focus of the present invention.

The specific programming requirements for communicating between a workstation control interface and a typical host computer processor, are described in IBM Publication No. SA21-9247-6, entitled "IBM 5250 Information Display System—Functional Reference Manual." This information is incorporated by reference herein, as a disclosure of the required programming formats and data interchange. However in addition to the disclosure therein, the present invention requires implementation of additional processes which may be incorporated into the software of the workstation control interface. In particular, the present invention is useful in solving entry field problems inherently related to the restricted size of windows, and improving the aesthetics in terms of user interaction with certain panel types.

FIG. 6 shows a typical prior art display panel presentation, wherein five entry fields are presented, each entry field having a field prompt message text associated therewith. Each of the entry fields is represented by a solid line, displaced by a predetermined distance from the field prompt text. The first and second entry fields are limited in length to less than the number of columns remaining in the respective panel rows. The third entry field is longer than the number of columns remaining in the panel row opposite the field prompt "Copy List," and the entry field wraps to the first column of the next row and extends partially across the next row. The fourth entry field is sufficiently long to wrap to two subsequent rows, and the fifth entry field is sufficiently long to wrap to a second row and to extend partially across the second row. Whenever an entry field wraps to one or more subsequent panel rows, it creates an unaesthetic appearance to the panel, for the entry field data and the field prompt text sometimes become difficult to distinguish; particularly in the case when an entry field has pre-filled data. Also, when text is entered into the entry field, words are sometimes split at the right edge of a row.

The problem illustrated by the example of FIG. 6 becomes compounded in the windowing environment. Since some windows may be small, average sized entry fields (about 40 characters long) seem extremely large inside a window. In practice, window width is often determined by the size of the largest entry field within the window, even though it is desirable to keep windows as small as possible so they do not cover a great deal of area of the underlying panel.

For purposes of the present invention, we have defined a new and special entry field parameter, called the "continued entry field," which will be hereinafter described. A continued entry field is made up of predefined "segments" which are initially defined by the host processor data manager software, and the information defining these segments is transferred to the workstation control interface by means of special indicators embedded in the 5250 data stream. When information is entered into a continued entry field from a terminal keyboard, or where previously entered data is modified at the terminal keyboard, the workstation control interface initially processes the entered information according to the segment of the continued entry field wherein the data was entered. This enables the workstation control interface to maintain control over the entry field display position, and to consistently display the entry field information according to the predefined segments. After entry of information into a panel has been completed, the workstation control interface transfers the contents of the entire continued entry field to the host processor together with any data from other entry fields.

FIG. 7 illustrates the panel representation of FIG. 6 when practiced according to the teachings of the present invention. In this example, each entry field has the same number of entry input positions as the corresponding entry fields of FIG. 6, but the width of each entry field has been controlled so as to provide a more aesthetically pleasing panel display (prompt text on the left, entry fields on the right, which is an ease-of-use enhancement). The continued entry field presentation of FIG. 7 is made possible by the use of the special entry field parameters, wherein the host application program defines a set of continued field segments and arranges them in the desired set of positions in the window or panel. The host application transmits its defined continued entry field information to the workstation control interface, using the preexisting data stream mechanisms as defined in the 5250 functions reference manual, including "set buffer address" and "start of field" orders, to position and define each segment in the set of continued fields. In addition, each segment definition includes a "Field Control Word" (FCW) that identifies it as a segment in a set of continued fields. The field segments can be arranged within the panel as desired, as in the rectangular arrangement shown in FIG. 7. The workstation control interface receives the individual continued field segments in the same manner as separate fields except for a new FCW for each segment; however, the workstation control interface retains the information concerning the location and length of the continued field segments in order to process editing of data within the fields.

The set of continued field segments are treated by the workstation control interface as a singular field when edit keys are activated when the cursor is within the field. Examples of edit keys are the "delete," "insert," "erase EOF" keys. For example, when the user depresses the "delete" key when the text cursor is positioned under a character in a segment of a continued field, the character becomes deleted and all data in the field segment after the deleted character is shifted to the left. The leftmost character in the next subsequent field segment is shifted into the rightmost position of the field segment of the previous row, and the remaining text characters in the next row field segment are all shifted to the left one position. A null character is written in the rightmost position of the last field segment.

If any character in a displayed continued entry field is modified by the user, the workstation control interface treats all field segments as modified when entry field data is to be returned to the host application, for example, after the user depresses an "enter" key. When a key requiring host processing is depressed, the field data for the entire set of continued field segments is returned to the host processor, even if only a single field segment has been modified.

The foregoing example illustrates a principal advantage of the present invention, which is that the workstation control interface is permitted to retain local control over the display images of continued entry fields, by independently controlling the display position of continued entry field information for each of the segments of the field. At the same time, the workstation control interface transfers the entire continued entry field data to the host processor in a conventional manner when host application processing is required. An inbound data stream contains a data stream escape followed by field coordinates and entry field data for each modified field. For a continued field, all data from all segments is returned after the coordinates of the first segment. The identity and position of each of the continued entry field segments is preserved in workstation control interface memory during this transmission. This is an advantage over the prior art, for in the prior art if a long field was broken into two or more separate fields, only those portions of the field that were modified would be returned to the host processor in response to a "Read Modified Fields" command. This increases the complexity of the applications software, because it then needs to keep track of the field data in each portion of a long entry field and reconnect the portions after the "Read Modified Fields" command is processed.

Figure 8:
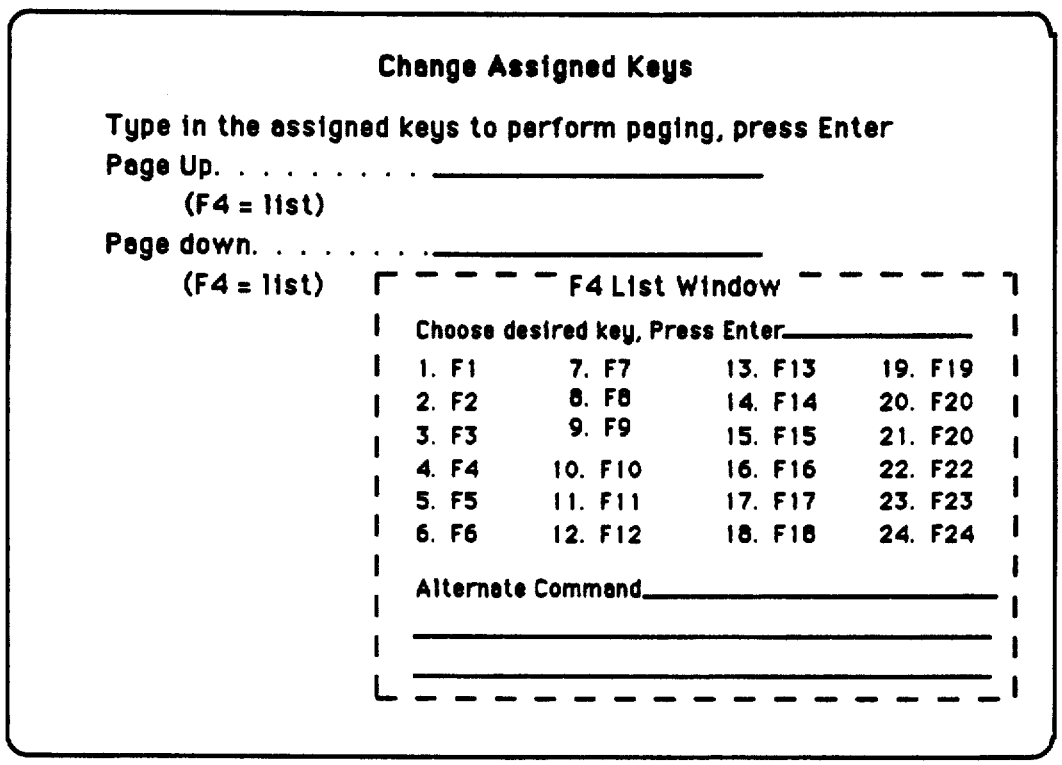
FIG. 8 shows an example of a panel presentation of a continued field in a window.

FIG. 8 is a further example of the advantages of the present invention, especially in connection with the display of "windows." In FIG. 8, the dotted outline illustrates a window having two entry fields, each of which are portrayed by solid lines within the window. The first entry field occupies only the number of character spaces provided for in the column width of the window. The second entry field is a continued entry field having three segments, each segment being predefined to have a width limited to the window size displayed on the screen. The number of choices available for entry in the first entry field are limited to the numerical choices "1." through "24.", therefore the first entry field is more than adequate to accommodate the available choices. The choices available for entry into the second entry field are also limited to the total size of the entire continued entry field, although for display purposes the entry choices are further limited to the continued entry field segment widths. If an entry is made which exceeds the width of the first segment, the entry is continued into the second segment and, if necessary, is continued into the third segment. Each of the segments are indicated by a special field control word which defines the segment as first, middle or last. When the entries are processed by the host application software, the identities of the continued field segments are preserved, so that further display images will adhere to the same continued entry field definitions. In the "windows" environment it is apparent that the present invention permits the presentation and display of a multi-row entry field within a window, and this flexibility permits the host application software to build a smaller window than might otherwise be possible. The same presentation could occur if the host application software created multiple separate entry fields within the window, but the editing of field data would not be continuous, and field data read processing would become much more complicated.

Figure 9A:
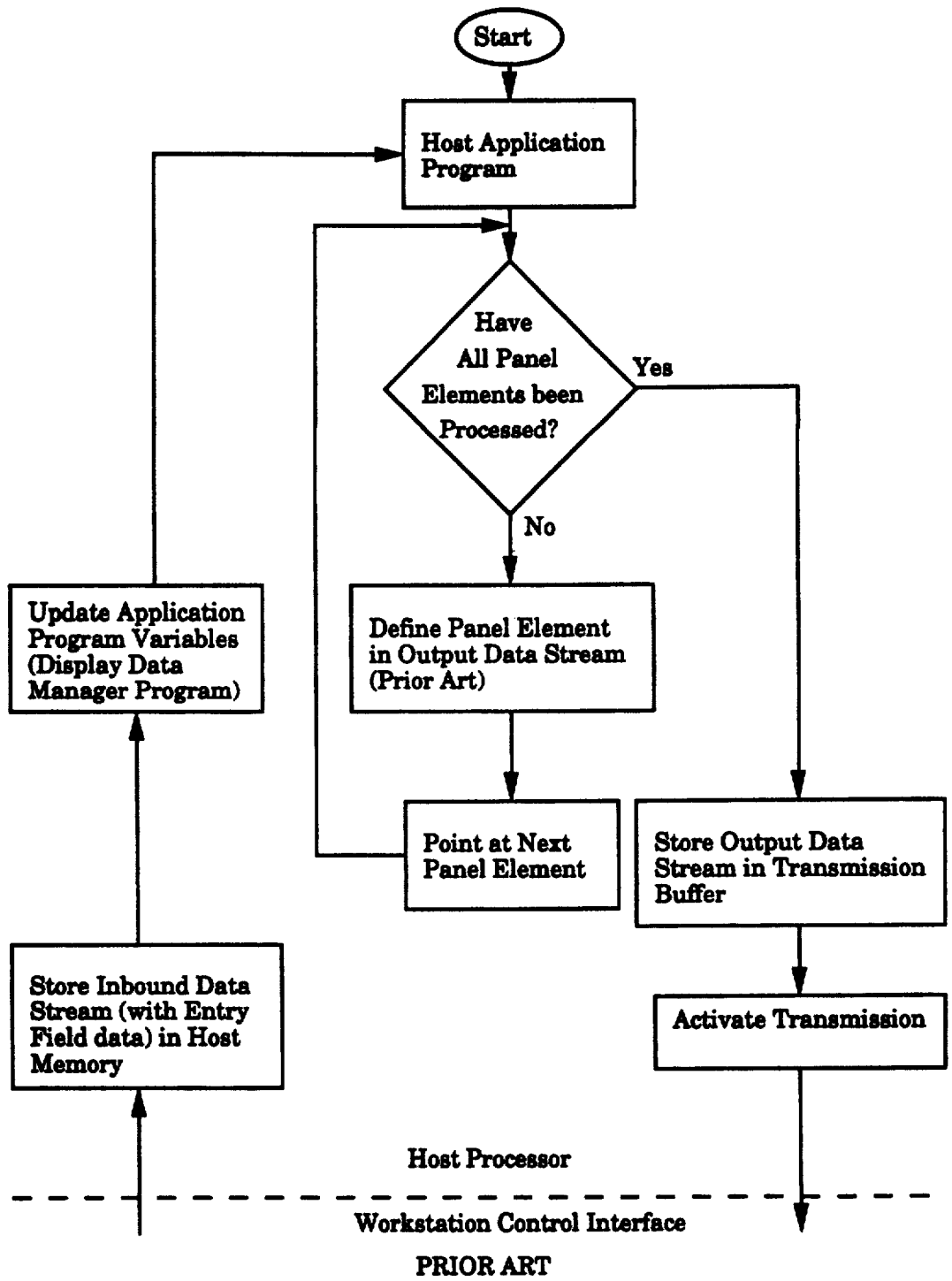
FIGS. 9A and 9B show a flow chart illustrating prior art host and workstation control interface processing for a panel.
Figure 9B:
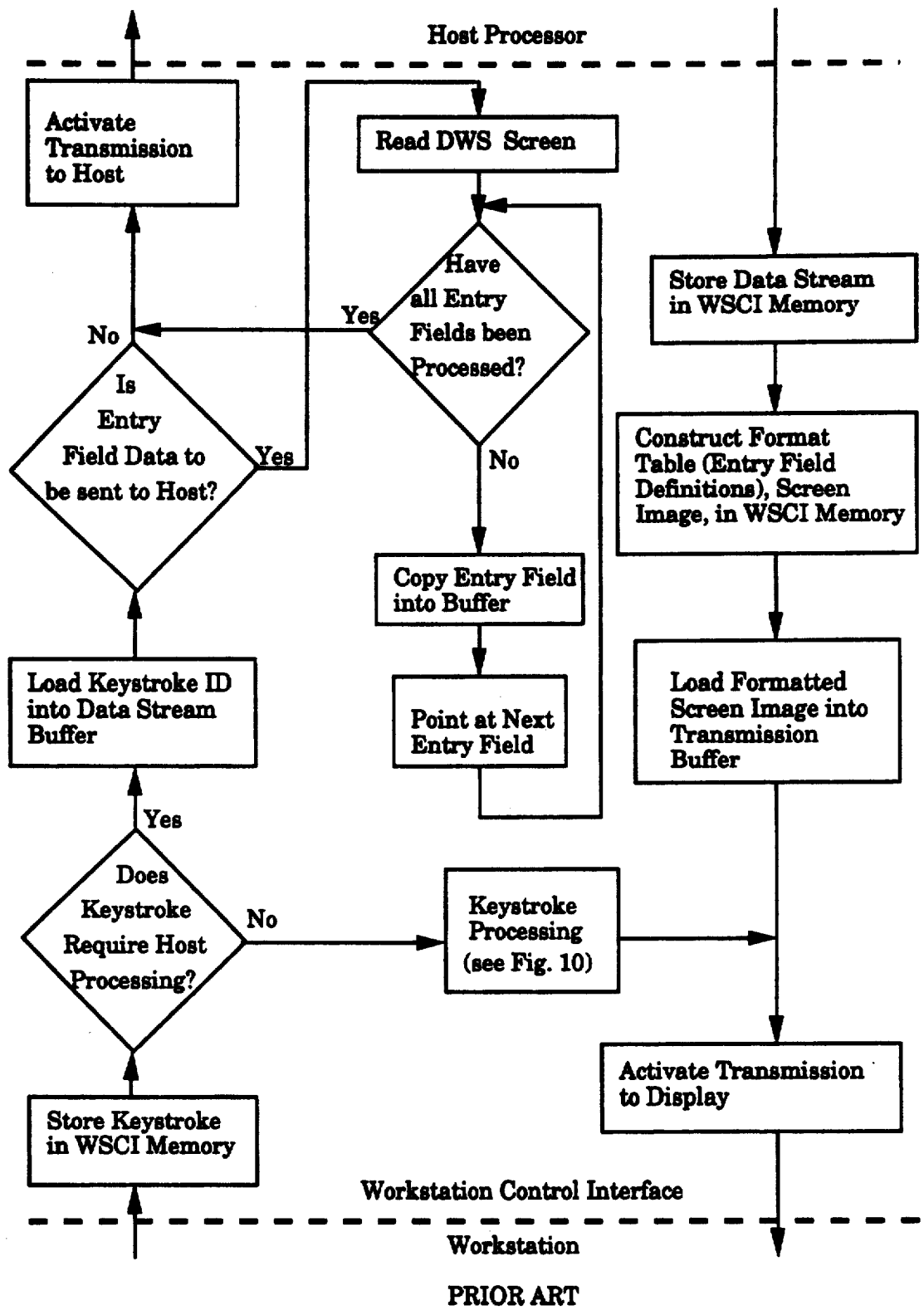

FIGS. 9A and 9B are flow charts illustrating host and workstation control interface processing of a panel according to the prior art. For purposes of the flow charts illustrated in FIGS. 9A and 9B, and for the subsequent flow charts illustrated herein, it is presumed that the overall computer system is organized according to the diagram of FIG. 5. In other words, a host processor controls the execution of one or more applications programs, and the applications programs are executed in concert with display data manager software for purposes of communicating with a plurality of terminals. The terminals may be located at positions which are remote from the host processor, and the communication takes place via cables connected between all of the terminals and a workstation controller or workstation control interface, which is connected to communicate with the host processor. The vehicle for communication between the display data manager program and the workstation control interface is a 5250 data stream, which is constructed and transmitted according to techniques which are well known in the prior art. A feature of the 5250 data stream is that it incorporates not only the identification and control signals required for activating any of the connected remote terminals, but also that it conveys the necessary keyboard and/or display information which is associated with specific remote terminals. Transmissions from the remote terminals back to the host processor are also conveyed via 5250 data streams, which are constructed within the workstation control interface. A feature of the workstation control interface in the prior art is that, whereas it serves as a communications interface between host processors and remote terminals, it performs very few independent logical control and decision making functions. Therefore, many keystrokes from a user at any of the plurality of terminals are passed via the workstation control interface to the host processor for recognition and response, and a display message created within the host processor is communicated via the workstation control interface to the remote terminal selected. The present invention enables the workstation control interface to perform more of the logical and decision making functions relating to each of the display screens to which it is connected, and to assist in the editing functions performed by the user at any of the remote terminals to which it is connected.

FIG. 9A shows the flow chart for prior art processing within the host processor. The display data manager program receives an inbound 5250 data stream from the workstation control interface. This inbound data stream may include information relating to recent keystrokes made by the user at a remote terminal; the inbound data stream is transferred into memory locations within the host processor. The display data manager program and the host application program then analyze the inbound data stream to process the information contained therein, by examining the data associated with each of the display screen entry fields, and processes the information according to the particular application software being executed. As a result of this processing, the host application program defines a list of panel elements and the display data manager program constructs a new output data stream which includes data for each display panel element affected by the received inbound data. After the host application program has defined all of the panel elements, and the display data manager program has completed the necessary processing steps, it stores the newly-constructed 5250 data stream in a transmission buffer, and activates a transmission of this data stream to the workstation control interface.

FIG. 9B illustrates the prior art processing activities which occur within the workstation control interface. An output 5250 data stream which has been transmitted from the host processor to the workstation control interface is initially stored in memory locations within the workstation control interface. The workstation control interface then constructs a format table to define display entry fields (field start and end locations), screen images, etc., and stores this information in its memory; it then loads the formatted screen images into a transmission buffer and activates a transmission to the selected workstation terminal. The workstation terminal processes this information according to techniques well known in the art, with a result that the terminal display screen receives a new or modified image as dictated by the host application program.

When an operator keystroke is made, the workstation terminal transmits this keystroke information to the workstation control interface, which stores it in memory. The workstation control interface then makes an initial determination whether the keystroke requires processing by the host application software. If it does not, the workstation control interface performs the processing according to the flow charts shown in FIG. 10 and FIG. 11. If the keystroke requires further processing by the host application software the keystroke information is loaded into an inbound data stream buffer. If the keystroke information does not contain entry field data required to be sent to the host processor, the information is immediately transmitted to the host processor. If the keystroke information does require included entry field data, the workstation control interface will "read" the display screen information contained at the remote terminal by sending a "read" command to the remote terminal. The remote terminal returns the requested display screen data; the workstation control interface stores this "read" data in a temporary buffer for processing. The workstation control interface examines this data to process all entry fields found on the display screen. After all the entry fields have been examined and modified entry field data loaded into an inbound data stream "buffer," the workstation control interface activates a transmission to the host, so that the host application software may receive all entry field information for its own processing needs.

Figure 10:
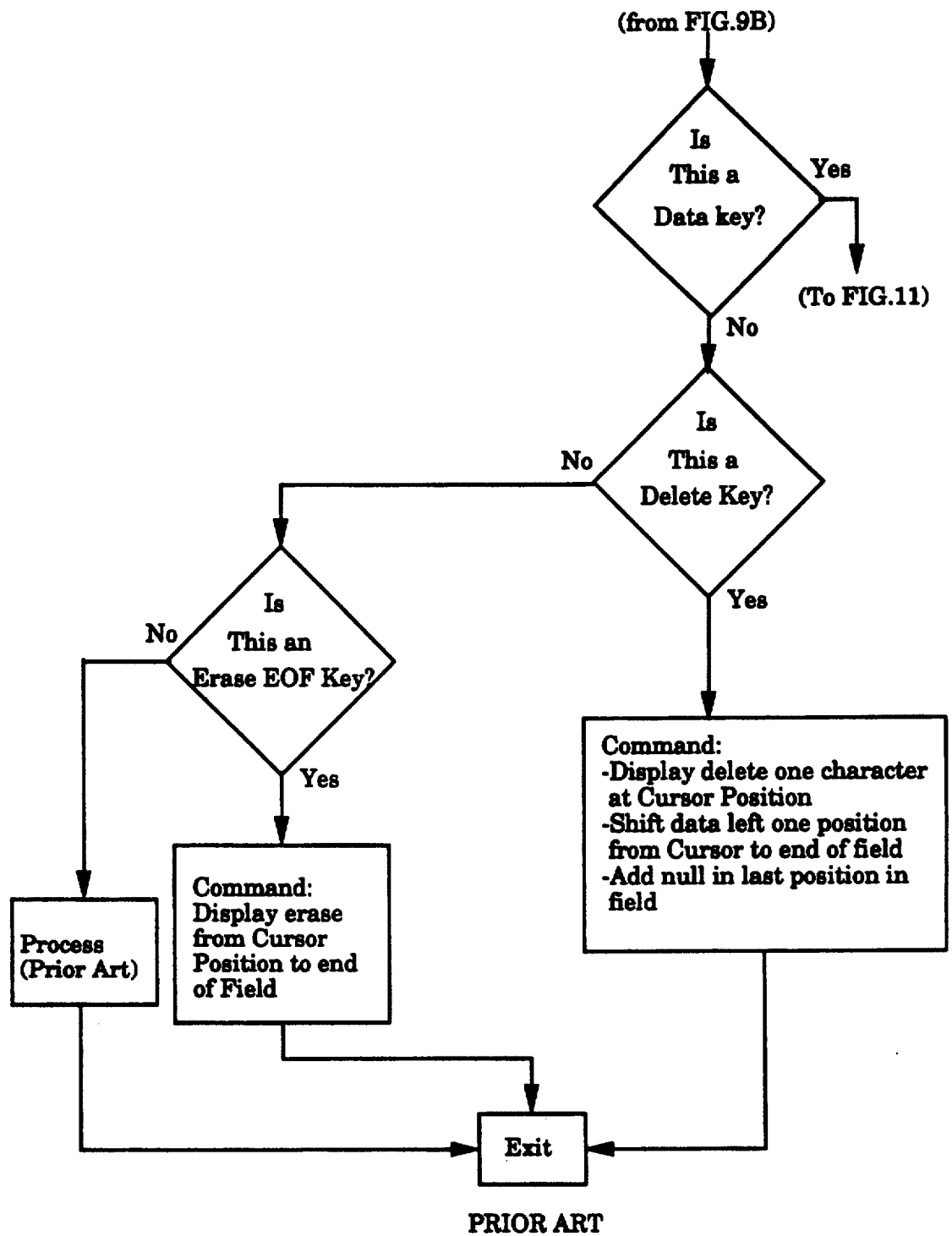
FIG. 10 shows a flow chart of prior art keystroke processing.
Figure 11:
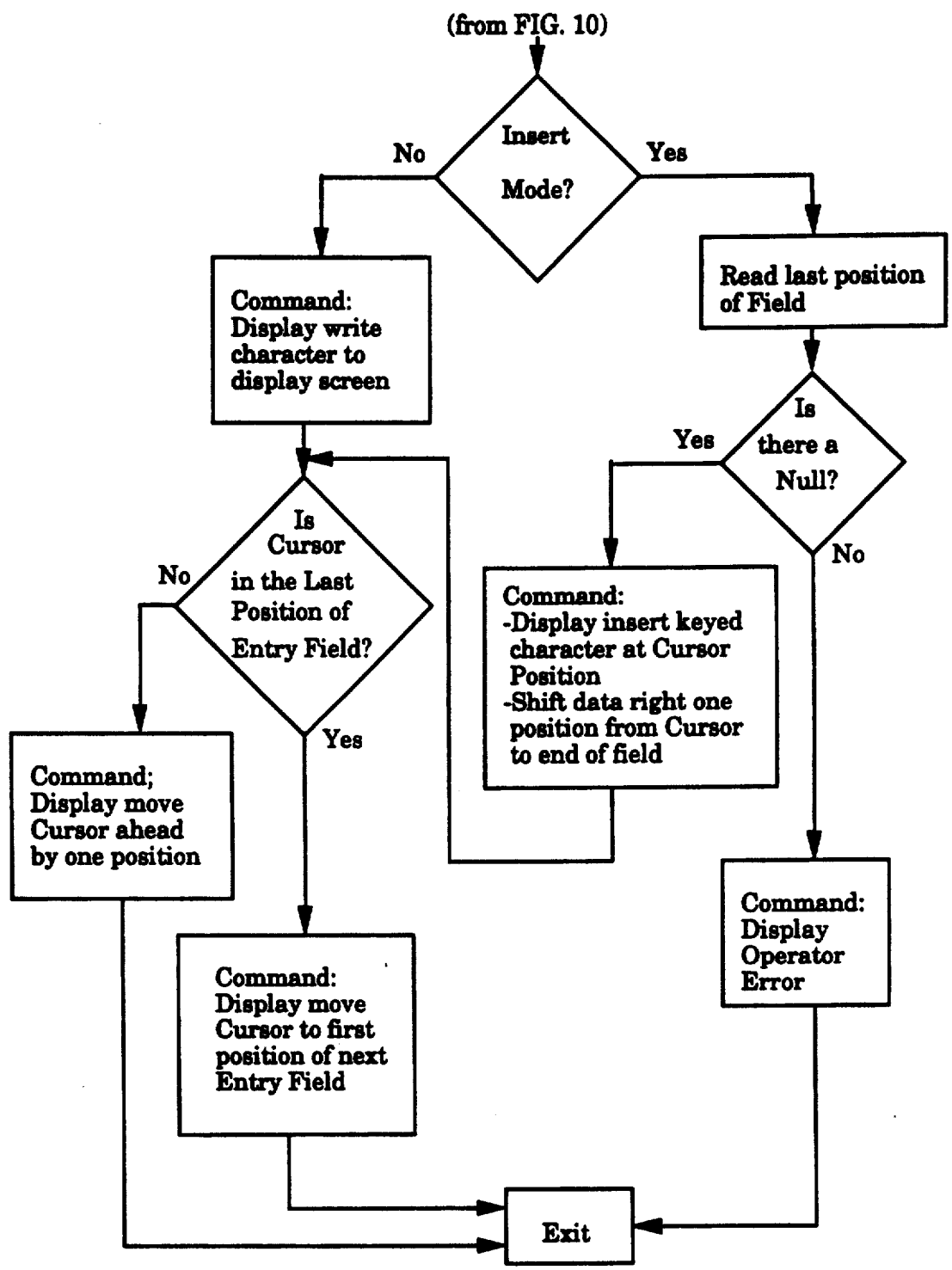
FIG. 11 shows a flow chart of prior art keystroke processing.

FIG. 10 and FIG. 11 are flow charts of prior art keystroke processing which may be performed within the workstation control interface, for certain keystroke operations. For example, if a keystroke operation is a data key keystroke the flow chart of FIG. 11 applies; if the keystroke was not a data key the flow chart of FIG. 10 applies, and it determines whether the keystroke was a delete key. If the keystroke was not a delete key, the workstation control interface next determines whether the keystroke was an "erase end of field" (erase EOF) key. If not, the workstation control interface processes the keystroke according to prior art techniques. If erase EOF, the workstation control interface generates a command to the workstation terminal to cause the terminal to erase the character at the current cursor position, and to erase all subsequent characters to the end of the entry field. If the workstation control interface determines that the keystroke was a delete key, it issues a command to the workstation terminal to cause the terminal to delete one character at the cursor position, and to left-shift all subsequent characters to the end of the entry field. The display-to-workstation control interface is a serial interface (versus row/column interface); therefore a "delete" key in a single multiple row entry field will cause all entry field data to be shifted left.

FIG. 11 shows the flow chart for processing keystrokes which are data key keystrokes. The workstation control interface first determines whether the workstation is in an insert mode. If it is, it examines the last position of the field to determine whether a null character exists at that position by issuing a "read" command to the workstation and waiting for the returned data byte. If there is no null character the workstation control interface commands the workstation screen to display an operator error message, which indicates "insert" is not allowed. If there is a null character at that position, the workstation control interface issues a command which causes the workstation to insert the keyed character at the cursor location, and to shift all subsequent characters to the end of the field one position to the right.

If the workstation control interface determines that the workstation is not in an insert mode, it issues a command to cause the workstation to write the keyed character on the display screen. It next determines whether the newly-written character occupies the last position of an entry field; if it does not, it issues a command to move the display screen cursor ahead by one position. If the displayed character does occupy the last position of an entry field, the workstation control interface issues a command to cause the display screen to move the cursor to the first position of the next entry field.

The foregoing illustrations, with reference to FIGS. 9-11, illustrate the types of keystroke processing which may occur within a prior art workstation control interface. The present invention simplifies and enhances the interaction between the host application program and the display terminal, particularly with reference to entry fields, to provide an enhanced degree of control and display function with respect to these fields. This enhancement will be described with reference to FIGS. 12-14.

Figure 12A:
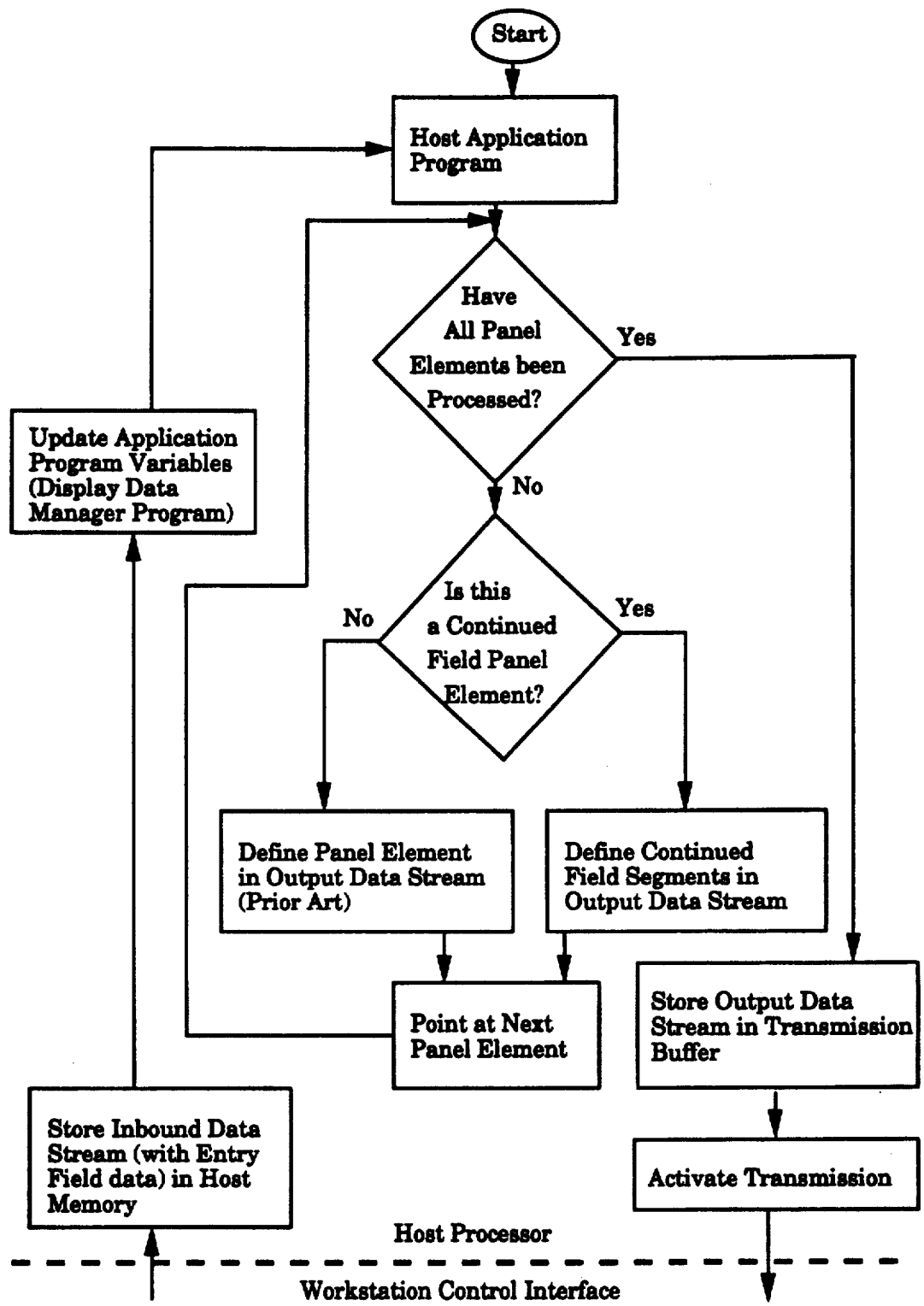
FIGS. 12A and 12B show a flow chart of host and workstation control interface processing for a panel according to the invention.

FIG. 12A shows a flow chart for processing within the host processor, according to the teachings of the present invention. The display data manager program receives an inbound 5250 data stream from the workstation control interface. This inbound data stream may include information relating to recent keystrokes made by the user at a remote terminal; the inbound data stream is transferred into memory locations within the host processor. The display data manager program and host application program then analyze the inbound data to process the information contained therein, by examining the data associated with each of the display screen entry fields. The application program defines the panel elements for the next display screen and the display data manager program constructs the output data stream. With respect to each element of data being examined, the host display data manager program determines whether a continued entry field is being processed. If it is not, the data is processed according to prior art teachings; if it is a continued entry field, the host display data manager program defines and distinguishes the continued field segments, so that these segments are defined in a suitable output data stream.

It should be recognized that, when the host application program constructs a first output data stream for an initial display at a remote terminal, the continued fields and the continued field segments must be wholly defined, and appropriate markers inserted into the data stream in order that the continued field segments may be identified in the workstation control interface when the data stream is disassembled.

After the host processor has assembled a data stream, either in response to an incoming keystroke or as a result of initially constructing a data stream for a remote terminal screen display, it stores the output data stream in a transmission buffer, and activates transmission of the data stream to the workstation control interface. This data stream incorporates data stream orders not only indicating the end points of entry fields, but also contains data stream orders indicating the end points of the continued entry field segments.

Figure 12B:
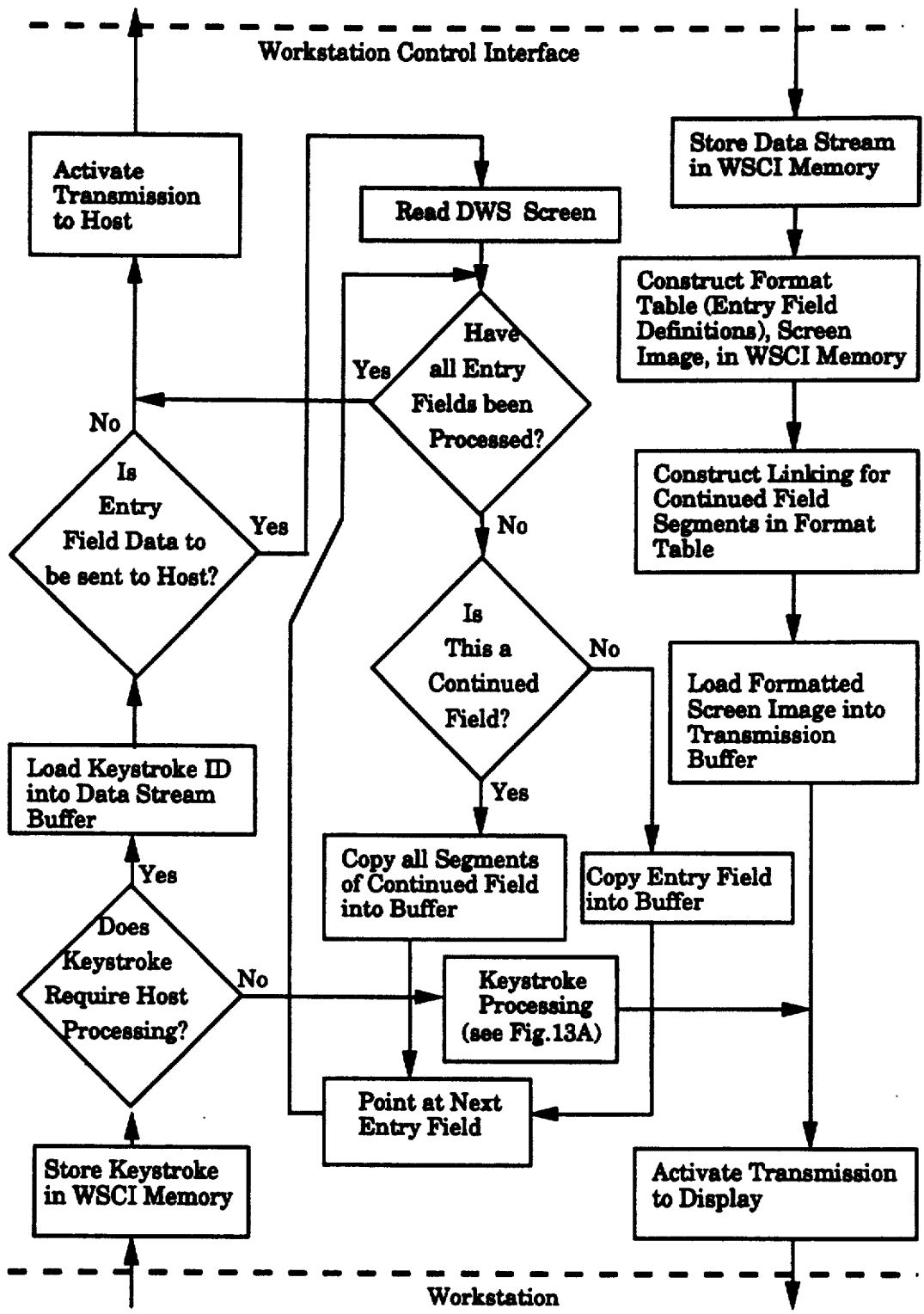

FIG. 12B illustrates the processing activities which occur within the workstation control interface according to the teachings of the present invention. An output 5250 data stream which has been transmitted from the host processor to the workstation control interface is initially stored in memory locations within the workstation control interface. The workstation control interface then constructs a format table to define display entry fields (entry field start-and-end locations, and segment identifiers), screen images, etc., and stores this information in its memory; it then constructs linking for the continued field segments in the format table, and loads the formatted screen images into a transmission buffer, and activates the transmission to the workstation terminal. The workstation control interface performs some validation checking on a continued field where first and last segments are required, with optional middle segments between. The remote terminal processes the information according to techniques well known in the art, with the result that the terminal display screen receives a new or modified panel as dictated by the host application program, and this panel includes the continued entry field segments positioned according to the layout determined by the host application program.

When an operator keystroke is made, the workstation terminal transmits this keystroke information to the workstation control interface, which stores it in memory. The workstation control interface then makes an initial determination whether the keystroke requires processing by the application software. If it does not, the workstation control interface performs the processing according to the flow chart shown in FIG. 13A. If the keystroke requires further processing by the host application software, the keystroke information is loaded into an inbound data stream buffer. If the keystroke information does not contain entry field data required to be sent to the host processor, the information is immediately transmitted to the host processor. If the keystroke information does include entry field data, the workstation control interface will "read" the display screen information contained at the remote terminal, which it does by sending a read command to the remote terminal; the remote terminal returns the requested display screen data; the workstation control interface stores this data in a temporary buffer for processing. In determining whether all entry fields displayed have been processed, the workstation control interface examines each entry field to determine whether it is a continued field; if it is not, the modified entry field data is copied into a buffer and the next entry field is examined. If it is, and any segment is modified, all segments of the continued entry field are copied into the buffer following the field coordinates of the first segment of the continued field and next entry field is examined. After all entry fields have been processed, the workstation control interface activates a transmission to the host processor, as before.

Figure 13A:
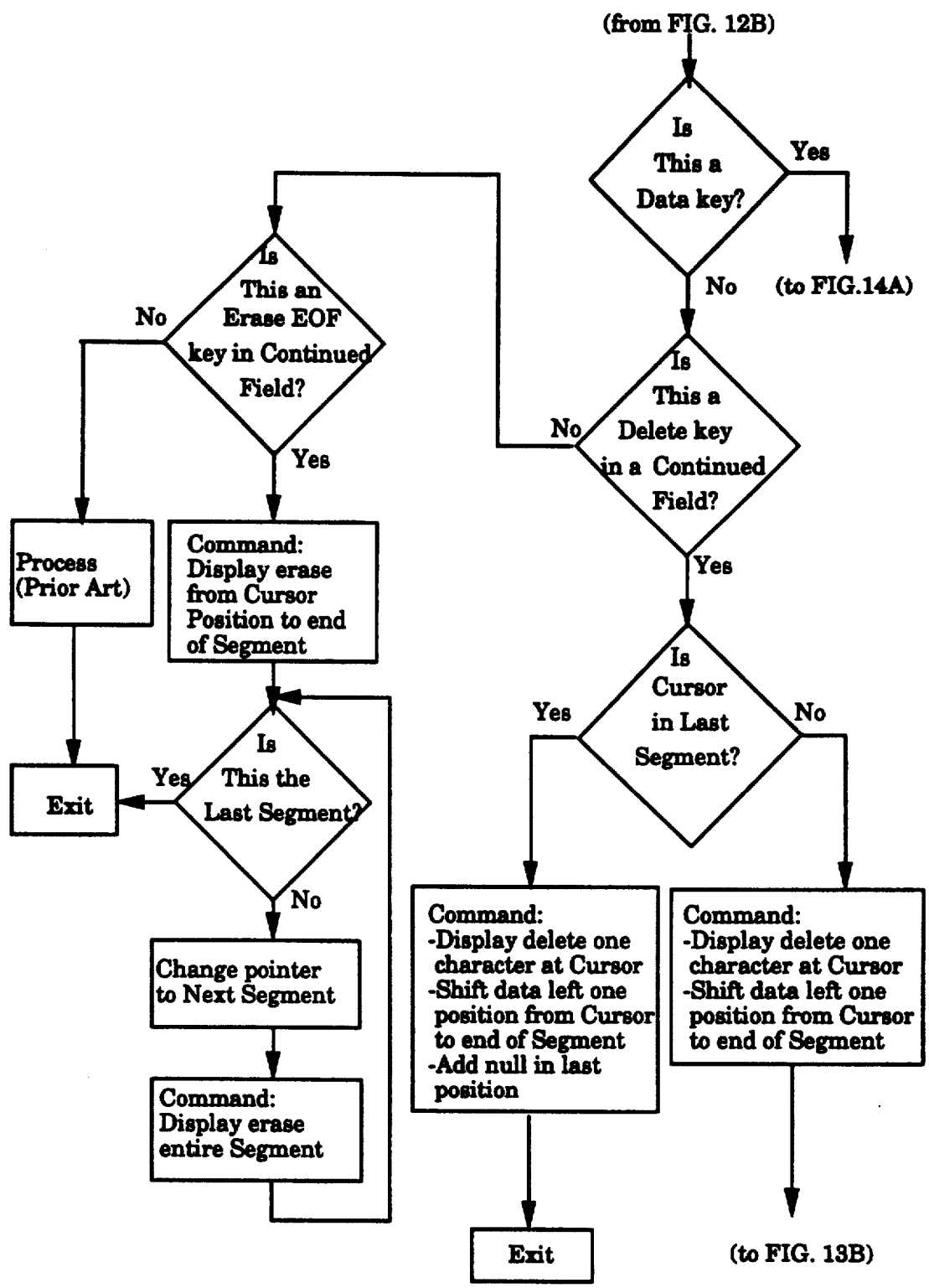
FIGS. 13A and 13B show a further flow chart of keystroke processing according to the invention.
Figure 13B:
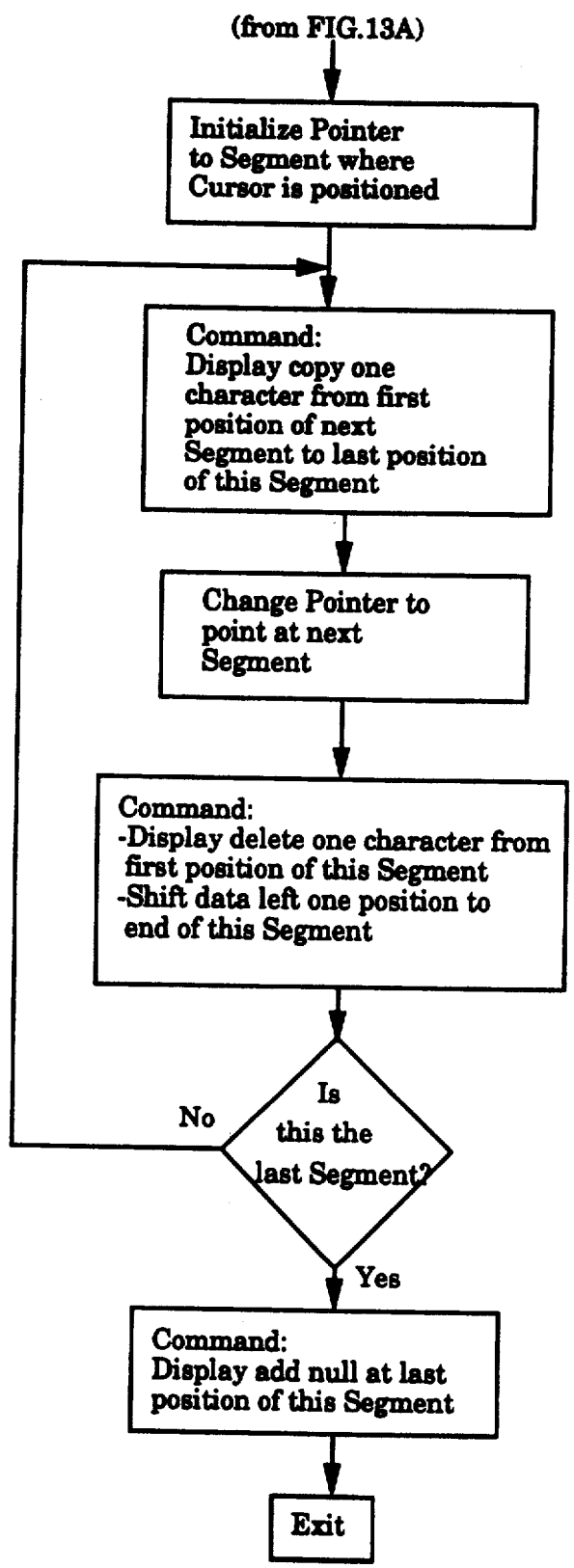
Figure 14A:
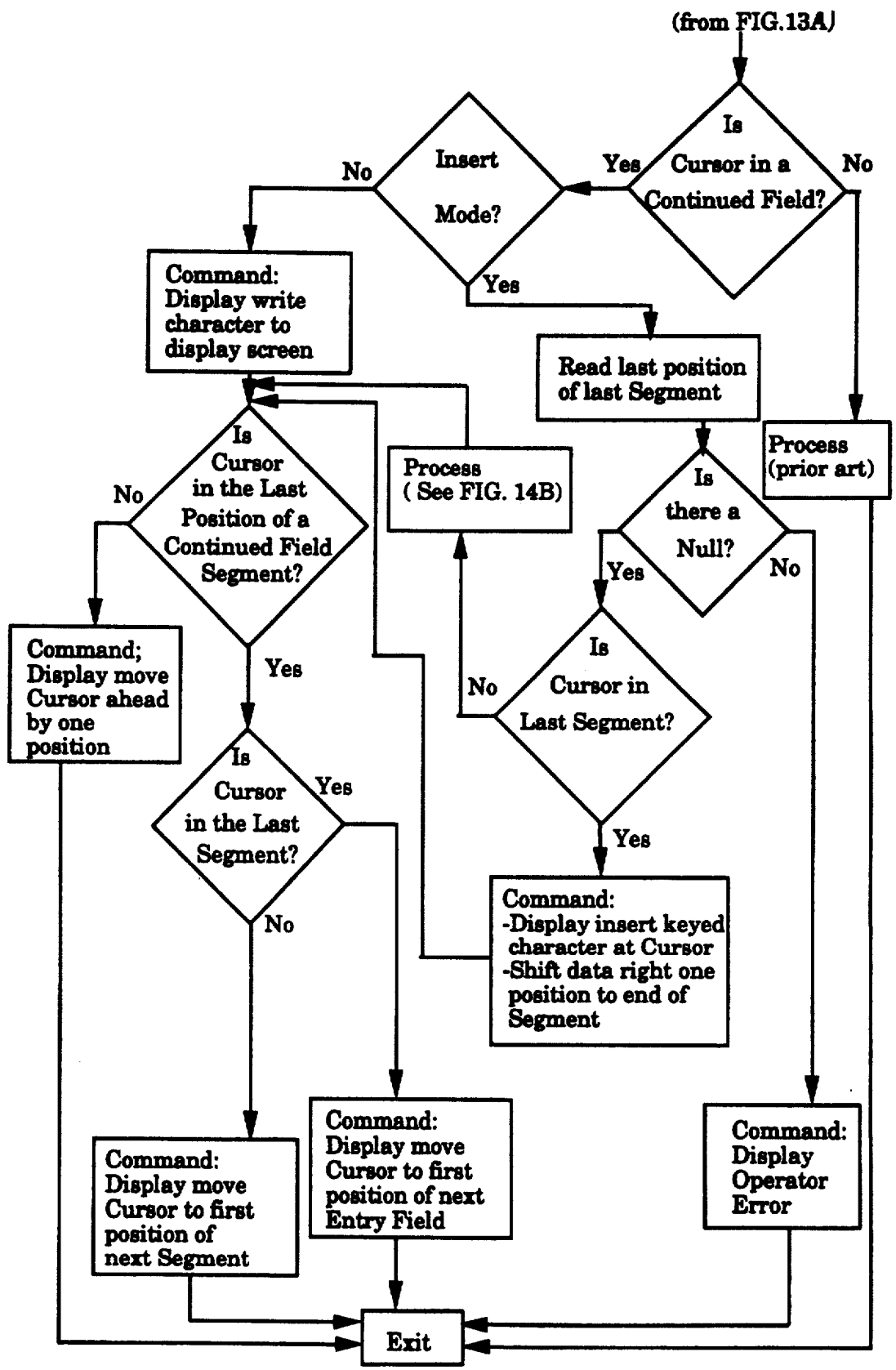
FIGS. 14A and 14B snow a further flow chart of keystroke processing according to the invention.
Figure 14B:
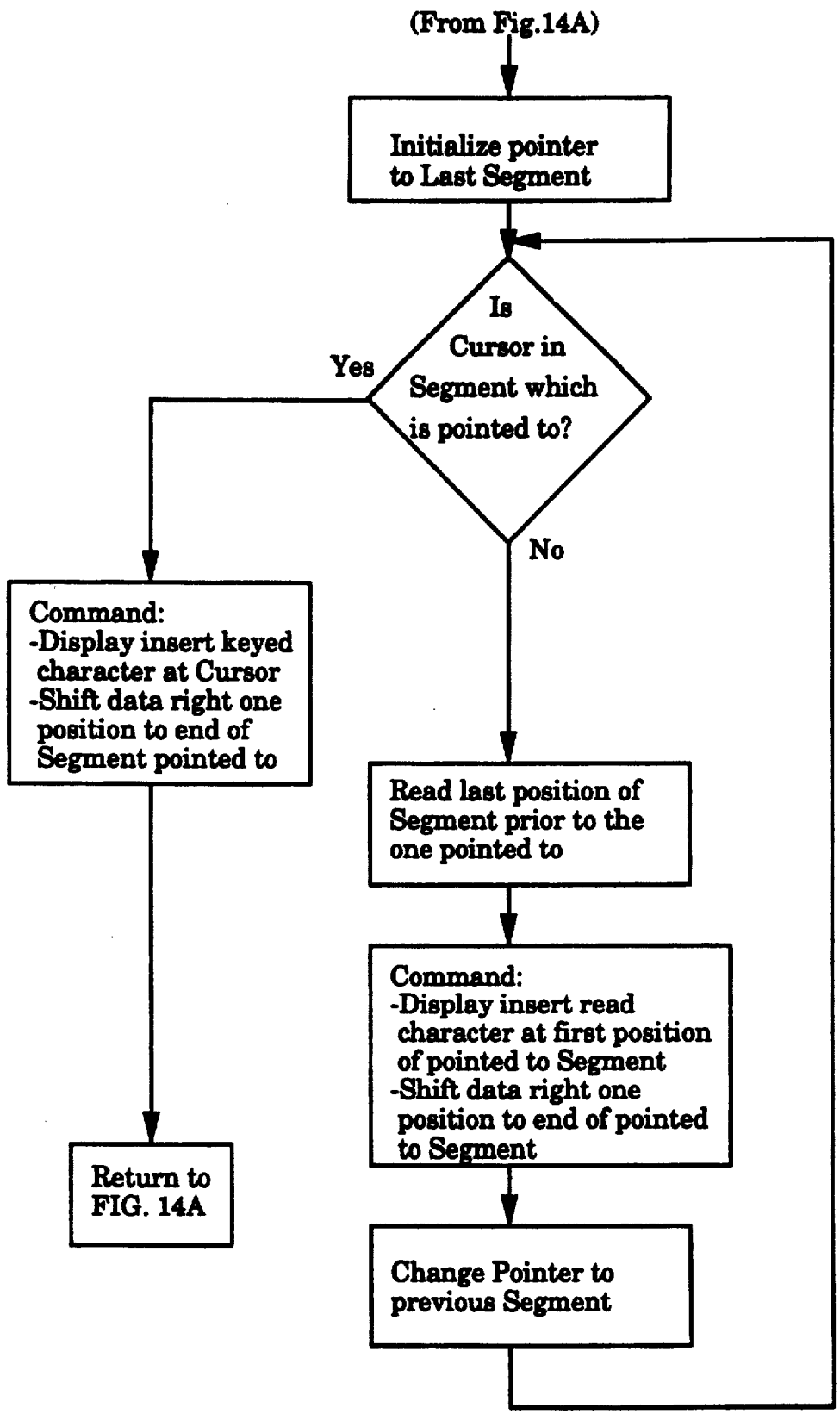

FIG. 13A illustrates a flow chart of keystroke processing which may be performed within the workstation control interface, for certain keystroke operations. This processing is similar to that described with respect to the prior art, although the processing requires the further step of examining whether the keystrokes were made in a continued field. For example, if a data key keystroke is in a continued entry field the processing proceeds as illustrated in FIG. 14A. If a delete key is in a continued entry field, the workstation control interface determines whether the cursor is located in the last segment of the field; if it is not, the workstation control interface issues a command to the display terminal to delete one character at the cursor position and to shift all subsequent characters in the segment one position to the left, and to proceed with processing as shown in FIG. 13B. If the cursor is in the last segment, the workstation control interface issues a command to the display terminal to delete one character at the cursor position and to shift all subsequent characters in the segment one position to the left, and add a null in the last position, and to exit to the process.

If the cursor was determined to not be in the last segment, after issuing the command to the display terminal to delete one character at the cursor position and left shift subsequent characters in the segment, the flow chart of FIG. 13B indicates that the workstation control interface initializes a pointer to the segment where the cursor is positioned. Next, the workstation control interface issues a command to the display terminal to copy one character from the first position of the next segment to the last position of this segment. Next, the workstation control interface changes the pointer location to point at the next segment. Next, the workstation control interface issues a command to the display terminal to delete one character from the first position of this segment, and to shift all subsequent characters in this segment one position to the left. The determination is next made whether this is the last segment, and if it is the process is discontinued after adding a null in the last position of the last segment. If it is not, the process continues to repeat the steps of copying and shifting and deleting characters until all segments of the continued field have been processed.

Referring back to FIG. 13A, if the workstation control interface determines that the keystroke is not a delete key, it next determines whether the keystroke is an erase EOF key in a continued field. If it is not, the processing is accomplished according to the prior art. Except, some keystrokes act somewhat differently when depressed within a continued field; for example, the "field exit" key acts much like an "erase EOF" key as described herein, but the cursor moves to the first position of the next entry field, and a "field advance"

key depression in a continued field moves the cursor to the first position of the next entry field.

If the keystroke is an "Erase EOF" keystroke in a continued field, the workstation control interface issues a command to the display terminal to erase all characters from the cursor position to the end of the segment. Next, the workstation control interface determines whether this is the last segment, and if it is the process is exited. If it is not, a pointer is changed to the next segment, and the entire next segment is erased. This process of examining the segment, pointing to the next segment, and erasing the entire segment is repeated until the last segment is processed.

FIG. 14A illustrates a flow chart of processing operations if a data key keystroke has been activated by the operator. In this case, the workstation control interface first determines whether the cursor is in a continued field; if it is not, processing takes place according to prior art teachings. If it is, the workstation control interface next determines whether the workstation is in an insert mode. If it is, the last position of the last segment is examined to determine whether there is a null character by issuing a read command to the workstation and waiting for the one byte of data. If not, a command is issued to the display terminal to indicate an operator error. If there is a null character, it is next determined whether the cursor is currently positioned in the last segment. If the cursor is positioned in the last segment, a command is issued to the display terminal to right shift all subsequent characters in the segment by one position, and to insert the keyed character at the cursor location. If the cursor is not in the last segment the flow chart of FIG. 14B indicates that a pointer is initialized to point to the last segment, and a determination is made whether the cursor is in the segment which is being pointed to. If not, a command is issued to the display terminal to read the last character from the previous segment into workstation control interface memory and to right shift all subsequent characters in the segment by one position, and insert the previously read character at the first position of the pointed to segment. The pointer is then changed to the previous segment and the operation is repeated until it is determined that the pointer is now pointing to the segment wherein the cursor is positioned. When this occurs, a command is issued to the display terminal to right shift all subsequent characters in the segment one position, and insert the keyed character at the cursor position.

Referring back to FIG. 14A, if the workstation control interface determines that the display terminal is not in the insert mode, a command is issued to the display terminal to write the character directly to the display screen. Next, it is determined whether the cursor is in the last position of a continued field segment. If it is not, a command is issued to the display terminal to move the cursor ahead by one position. If it is, a determination is made as to whether the cursor is in the last segment of the continued field. If it is not, a command is issued to the display terminal to move the cursor to the first position of the next segment. If the cursor is in the last segment, a command is issued to the display terminal to move the cursor to the first position of the next entry field.

In operation, the present invention enables an application program to not only define entry fields according to the well-known teachings of the prior art, but to further define continued entry fields, wherein the entry field is broken into predefined segments. The position and width of each of the entry field segments may be precisely dictated by the host application software, and all of this information is embedded into the 5250 data stream which is normally transmitted to the workstation control interface, and the remote terminal screen subsequently updated. The workstation control interface is able to utilize the position information relating to continued entry fields and segments so as to preserve entry field and segment position even in cases wherein the workstation control interface engages in some keystroke processing operations. When the user undertakes certain keystroke operations within a continued entry field (for example, data key or delete), the workstation control interface will process the keystrokes in the method described herein. For keystrokes requiring host processing the entire entry field is sent back to the host processor for further operations, while at the same time preserving the position information relating to the continued entry fields and segments. The overall effect of the invention is to permit significantly greater control over the positioning of entry fields on a display screen, particularly in the case wherein the host application program utilizes "windows." The precise positioning and control over entry field width becomes extremely important in the windows applications, because it is always desirable to display a window of the smallest size that is practicable for the information content within the window. The present invention enables the presentation of entry fields within windows, and more particularly, the presentation of precisely controlled multi-line entry fields within a window. Overall, the invention not only improves the efficiency and presentation of information being displayed on a remote terminal screen, but also improves the aesthetic appearance of such displayed information. Because the workstation control interface takes a vital part in the overall processing operations associated with the continued entry fields, it makes these functions possible.

In some cases, a workstation controller or PC running a host-based application using the same data stream described herein, the workstation controller or PC may have a dedicated screen buffer (for a workstation controller, the workstation controller would have a screen buffer for each DWS). In these cases, the read commands sent to the remote terminal as described herein are not required; instead, the workstation controller or PC uses the dedicated screen image buffer directly.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An apparatus for displaying entry field on workstation display screen panels in non-sequential panel locations, and linking said entry fields for processing as a single entry field, comprising:
   a) means for defining separate entry field segments within a single entry field definition, and for defining linking field control words to associate the separate entry field segments as parts of the single entry field definition;
   b) means for separately displaying the entry field segments on a workstation display screen panel in discontinuous positions; and c) means for changing any part of an entry field segment, and means for changing all subsequent entry field segments which are associated by said linking field control words.

2. The apparatus of claim 1, wherein said means for defining separate entry field segments further comprises a host processor, having means for constructing a data stream for transmission to a workstation control interface, said data stream including position information for each of said entry field segments and said linking field control words.

3. The apparatus of claim 2, wherein said means for separately displaying said entry field segments further comprises a workstation control interface having means for receiving said data stream, and means for constructing a panel display command for positioning said entry field segments on a display panel, and means for transmitting said command to any of a plurality of workstations; and one of said plurality of workstations having means for receiving said command and means for constructing a display screen image.

4. The apparatus of claim 3, wherein said means for changing any part of an entry field segment further comprises a workstation control interface having means for receiving said change, and means for developing a further command to the workstation which initiated the change, said further command instructing said workstation to incorporate the change to the workstation display screen image; said workstation control interface further having means for developing still further commands to said workstation to change each subsequent entry field segment associated with the changed entry field segment.

5. A method of displaying separate entry field segments within a single entry field definition on a workstation display screen, comprising the steps of:
   a) constructing a data stream in a host processor, said data stream including field control words defining respective entry field segments and identifying said segments as a part of a single entry field definition;
   b) transmitting said data stream to a workstation control interface, wherein said workstation control interface is connected to a plurality of workstations, each of said workstations having means for displaying display panel screen images; and
   c) storing, in said workstation control interface, said field control words defining respective entry field segments, and transmitting commands from said workstation control interface to a selected one of said workstations to display said separate entry field segments.

6. A method of changing data in a workstation display screen entry field when the entry field is comprised of a plurality of segments, comprising the steps of:
   a) entering the changed data into one of the plurality of segments, and changing the remaining data in the segment to accommodate the changed data; and
   b) changing each of the next subsequent segments by changing the data in each of the subsequent segments to accommodate the said changed one segment and thereby to create a continuous entry field comprising all of the segments.

* * * * *